E. W. PURVES.
FIRE HYDRANT COUPLING.
APPLICATION FILED DEC. 7, 1909.
959,258.
Patented May 24, 1910.
2 SHEETS—SHEET 1.
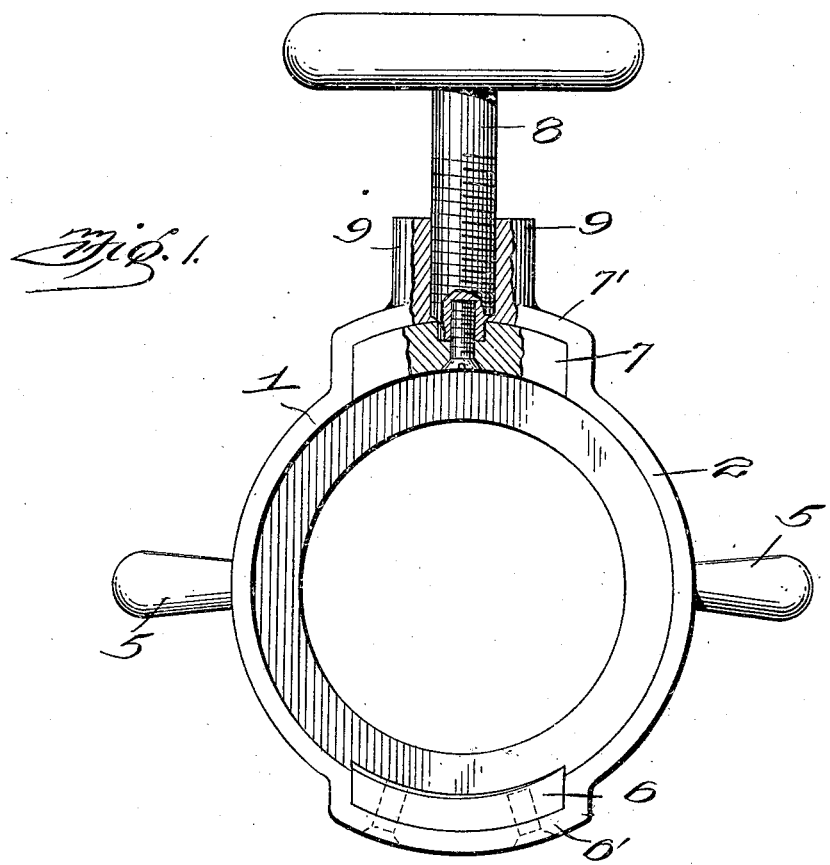
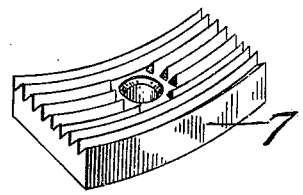

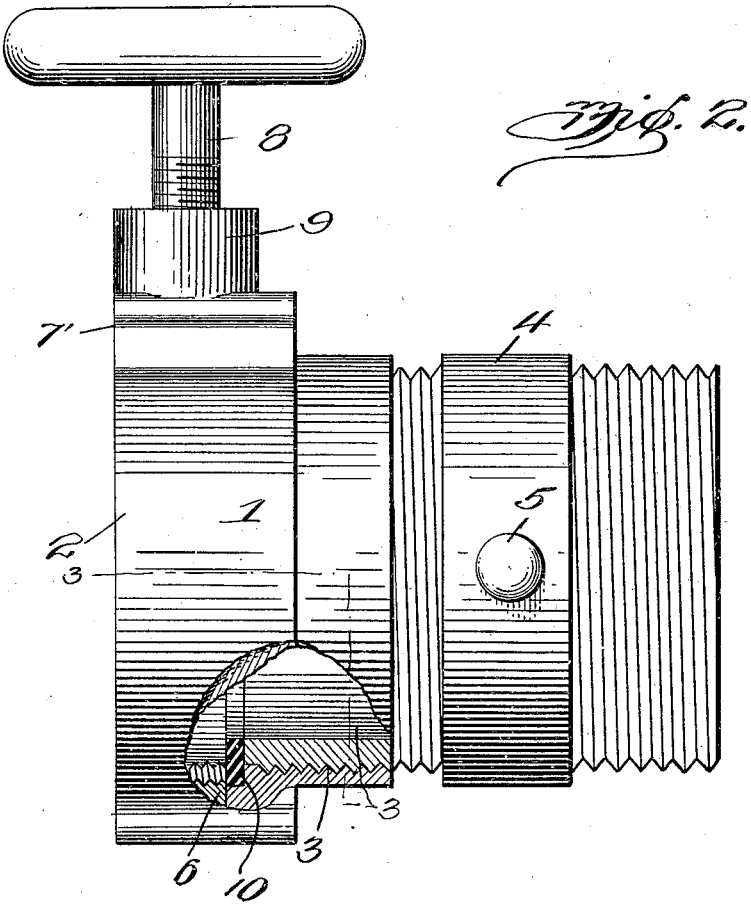
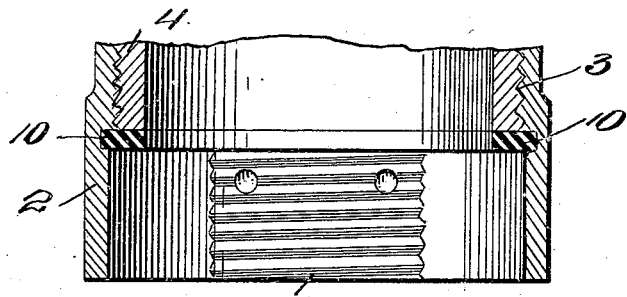

UNITED STATES PATENT OFFICE.

EDWARD W. PURVES, OF CHICAGO, ILLINOIS.

FIRE-HYDRANT COUPLING.

959,258.  Specification of Letters Patent.  Patented May 24, 1910.

Application filed December 7, 1909. Serial No. 531,788.

*To all whom it may concern:*

Be it known that I, EDWARD W. PURVES, a citizen of the United States, residing at Chicago, in the county of Cook and State of Illinois, have invented new and useful Improvements in Fire-Hydrant Couplings, of which the following is a specification.

This invention relates to improvements in fire-hydrant couplings and has for an object to produce a device of the class mentioned whereby quick access can be had to the fire-hydrant in case the threads on the nozzle of the same are found to be defective.

A further object is to produce a coupling for the purpose described comprising but few parts and which can be manufactured at a very small cost.

With these and other objects in view my invention consists in certain novel constructions and combinations of parts to be hereinafter more fully described, claimed and illustrated in the accompanying drawings, in which—

Figure 1 is an end view of the coupling of my invention, partly in section. Fig. 2 is a side elevation of the same partly in section. Fig. 3 is a detail sectional view taken on the line 3—3 of Fig. 2. Fig. 4 is a detail perspective view of the adjustable thread carrying section.

Referring to the drawings by characters of reference, the numeral 1 designates generally a fire hydrant coupling constructed in accordance with my invention and comprising an annular housing 2, the outer end of which is threaded as at 3 for the reception of a nozzle 4. The outer end of the nozzle 4 is threaded for the reception of the fire hose, while the intermediate portion carries a pair of handles 5 for the purpose of aiding in turning the said nozzle.

A pair of segmental thread carrying locking sections 6 and 7 are seated in recesses or recessed offsets 6' and 7' formed in the mouth of the housing. The segmental section 6 is rigidly retained in its seat by any suitable means, while the segmental locking section 7 is swiveled for vertical adjustment in its seat on the lower end of a threaded stem 8, which passes upward through an internally threaded sleeve 9 formed on the casing 2.

A gasket 10, of rubber or other suitable material, is seated in a groove formed in the casing 2, and rests against the inner end of the nozzle 4. When access is wished to the fire hydrant the coupling is slipped over the threads of the said hydrant nozzle and quickly secured thereto by turning the hand wheel mounted on the upper end of the stem 8, which forces the threads on the segmental sections 6 and 7 into engagement with the threads on the hydrant nozzle. The nozzle 4 is then screwed inward forcing the gasket 10 against the end of the hydrant nozzle and making a water tight joint.

From the foregoing it is obvious that a coupling is produced which will avoid much loss of time in case a defective thread is found to be on the hydrant nozzle, as the threaded nozzle of the hydrant may be clamped between the threaded members 6 and 7 of the improved coupling by turning the member 8.

Having thus described my invention, what is claimed as new is:—

1. In a fire-hydrant coupling, an annular casing, an adjustable exteriorly threaded nozzle secured in one end of the annular casing, offsets forming interior recesses in the opposite end of the casing, a segmental threaded section detachably secured in one recess and a radially adjustable segmental threaded section seated in the other recess.

2. In a fire-hydrant coupling, an annular casing, a pair of diametrically opposite offsets forming a pair of interiorly opening recesses in one end of the annular casing, a detachable segmental threaded locking section seated in one recess, a radially adjustable segmental threaded locking section seated in the opposite recess, interior threads found in the opposite end of the casing, a gasket seated in the intermediate portion of the casing, a nozzle adjustable in the threaded end of the casing and adapted to be forced against the gasket and move the same laterally in the casing.

In testimony whereof I affix my signature in presence of two witnesses.

EDWARD W. PURVES.

Witnesses:
MARTIN J. CURLEY,
EDWARD J. DOYLE.